United States Patent
Jacob

(10) Patent No.: US 9,097,177 B2
(45) Date of Patent: Aug. 4, 2015

(54) TURBOCHARGER

(75) Inventor: Stefan Jacob, Lachen-Speyerdorf (DE)

(73) Assignee: BorgWarner Inc., Auburn Hills, MI (US)

( * ) Notice: Subject to any disclaimer, the term of this patent is extended or adjusted under 35 U.S.C. 154(b) by 377 days.

(21) Appl. No.: 13/320,277

(22) PCT Filed: May 11, 2010

(86) PCT No.: PCT/US2010/034294
§ 371 (c)(1),
(2), (4) Date: Nov. 14, 2011

(87) PCT Pub. No.: WO2010/135102
PCT Pub. Date: Nov. 25, 2010

(65) Prior Publication Data
US 2012/0060495 A1 Mar. 15, 2012

(30) Foreign Application Priority Data
May 18, 2009 (DE) .......................... 10 2009 021 739

(51) Int. Cl.
*F02D 23/00* (2006.01)
*F01D 17/00* (2006.01)
*F02B 37/18* (2006.01)
*F01D 17/10* (2006.01)

(52) U.S. Cl.
CPC ............ *F02B 37/186* (2013.01); *F01D 17/105* (2013.01); *F05D 2220/40* (2013.01); *F05D 2240/55* (2013.01); *Y02T 10/144* (2013.01)

(58) Field of Classification Search
CPC . F01D 17/105; F02B 37/186; F05D 2240/55; F05D 2220/40; Y02T 10/144
USPC .............. 60/602, 612; 123/562; 415/165
See application file for complete search history.

(56) References Cited

U.S. PATENT DOCUMENTS

| | | | |
|---|---|---|---|
| 5,857,337 A * | 1/1999 | Kawasaki | 60/602 |
| 8,109,257 B2 * | 2/2012 | An et al. | 123/562 |
| 2005/0178122 A1 * | 8/2005 | Hastings et al. | 60/602 |
| 2006/0213195 A1 * | 9/2006 | Leavesley | 60/605.1 |
| 2007/0119170 A1 * | 5/2007 | Masson et al. | 60/600 |
| 2007/0204616 A1 * | 9/2007 | Martin et al. | 60/602 |
| 2008/0031750 A1 * | 2/2008 | Gomilar et al. | 417/409 |

(Continued)

FOREIGN PATENT DOCUMENTS

DE 102009007364 A1 * 8/2010

*Primary Examiner* — Kenneth Bomberg
*Assistant Examiner* — Paolo Isada
(74) *Attorney, Agent, or Firm* — A. Michael Tucker; Stephan A. Pendorf; Patent Central LLC

(57) ABSTRACT

The invention relates to a turbocharger (1) having a wastegate arrangement (6), in which the leakage at the guide of the regulating flap in a multi-stage turbocharger arrangement is reduced. The turbocharger (1) comprises a compressor (2) and a turbine (3). The turbine (3) comprises a turbine housing (4) which has a turbine housing outlet (5), and a wastegate device (6) which has a regulating flap (7). The regulating flap (7) is arranged on a regulating flap shaft (9) which is guided in the turbine housing (4) by means of a bush (8). The bush (8) is provided with an annular groove (11) formed on its inner circumference (10), which annular groove (11) is connected by means of at least one connecting bore (12, 13) to an annular collecting groove (14) which is provided in the turbine housing (3) and which is connected by means of a relief bore (15) to the turbine housing outlet (5).

5 Claims, 2 Drawing Sheets

(56) References Cited

U.S. PATENT DOCUMENTS

| | | |
|---|---|---|
| 2009/0028694 A1* | 1/2009 | Naemura et al. ............... 415/145 |
| 2009/0064679 A1* | 3/2009 | Parker ............................. 60/602 |
| 2009/0077966 A1* | 3/2009 | Lombard et al. ................ 60/602 |
| 2009/0151352 A1* | 6/2009 | McEwan et al. ................ 60/602 |
| 2009/0226304 A1* | 9/2009 | Frankenstein et al. ........ 415/159 |
| 2010/0095672 A1* | 4/2010 | An .................................. 60/602 |
| 2010/0143099 A1* | 6/2010 | Bywater et al. ............... 415/148 |
| 2010/0263370 A1* | 10/2010 | Wu et al. ......................... 60/602 |
| 2010/0266390 A1* | 10/2010 | Henderson et al. ........... 415/151 |
| 2011/0000209 A1* | 1/2011 | Boening et al. ................. 60/602 |
| 2011/0011085 A1* | 1/2011 | Garrett et al. ................... 60/615 |
| 2011/0116910 A1* | 5/2011 | Lilly ............................. 415/148 |
| 2011/0296831 A1* | 12/2011 | Pursifull ......................... 60/602 |
| 2011/0318168 A1* | 12/2011 | Kiefer .......................... 415/148 |
| 2012/0055154 A1* | 3/2012 | Ebert ............................... 60/602 |

* cited by examiner

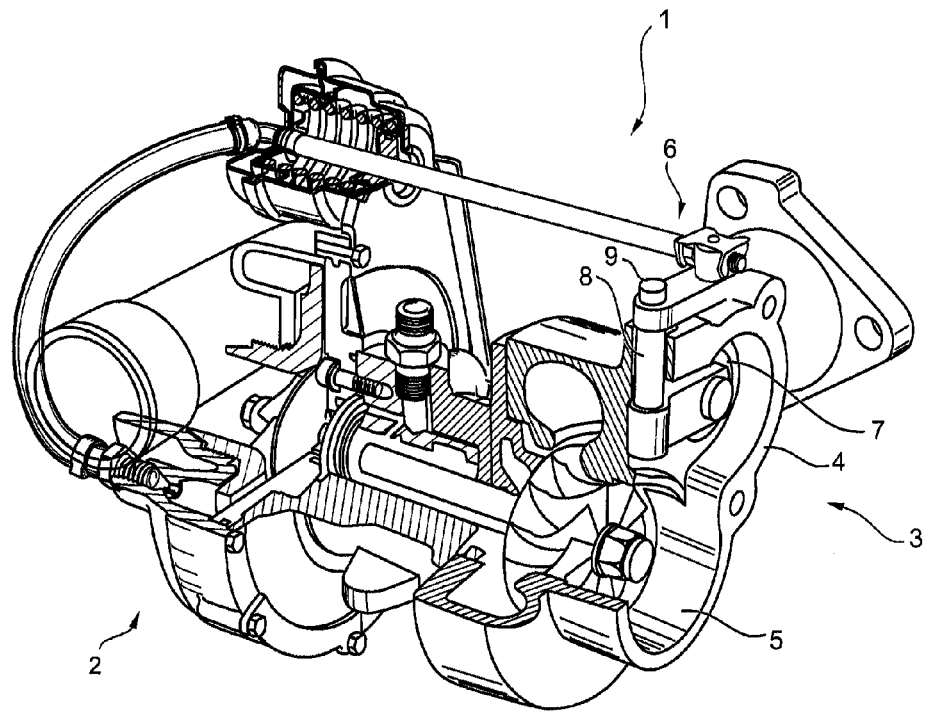
FIG. 1
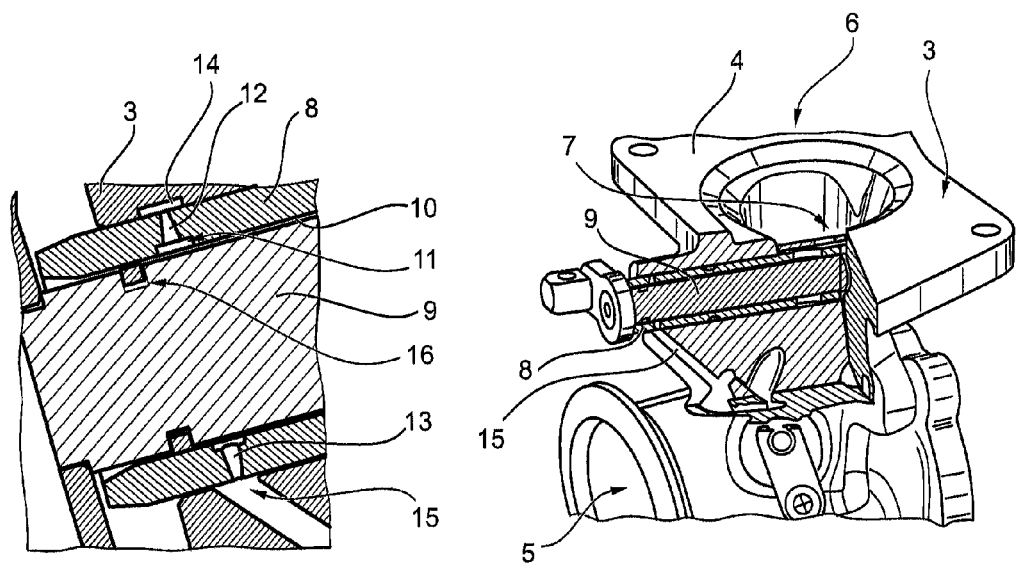
FIG. 2  FIG. 3

TURBOCHARGER

The invention relates to a turbocharger according to the preamble of claim 1.

A generic turbocharger is known from EP 1 256 703 B1.

Turbochargers of said type are used in internal combustion engines which, over a wide operating range, divert large exhaust-gas quantities past a turbine. In known designs of exhaust-gas turbochargers with a so-called wastegate arrangement, sealing problems occur because exhaust-gas leakage occurs between the outer circumference of the regulating flap shaft and its guide, the magnitude of which exhaust-gas leakage is dependent on the arrangement of the regulating flap and the level of the exhaust-gas pressure. In the case of single-stage systems, the regulating flap is arranged at the turbine outlet and the exhaust-gas pressure downstream of the turbine outlet therefore prevails at the flap guide, such that only small leakage quantities arise on account of the pressure difference prevailing with respect to the environment. In the present prior art, in the case of multi-stage supercharging, a particularly high exhaust-gas pressure is reached at the regulating flap guide if the regulating flap is arranged at the turbine inlet, because the high exhaust-gas pressure prevailing upstream of the turbine wheel acts there. This is the case for example in a low-pressure turbine of a two-stage system, since the inlet of the low-pressure turbine is provided with a regulating flap which constitutes a bypass of the high-pressure turbine. The sealing of such a regulating flap at its guide in order to minimize the leakage of exhaust gas out into the environment is provided by means of a plurality of piston rings arranged one behind the other between the flap shaft and a bush arranged in the turbine housing.

It is therefore an object of the present invention to provide a turbocharger for an internal combustion engine according to the preamble of claim 1, which turbocharger, while having multi-stage supercharging, reduces the leakage at the guide of the regulating flap and thereby enables an improvement in the sealing action.

Said object is achieved by means of the features of claim 1.

Subclaims 2 to 4 relate to advantageous refinements of the invention.

In a low-pressure supercharger of a multi-stage supercharging arrangement, therefore, a relief bore is arranged between the outlet of the low-pressure turbine housing and an annular groove of the turbine housing in the region of the bush outer circumference. The bush likewise has an annular groove in its inner circumference at the position of the turbine housing annular groove. Here, the two annular grooves are connected to one another by means of at least one connecting bore.

Further details, advantages and features of the present invention will emerge from the following description of exemplary embodiments on the basis of the appended drawing, in which:

FIG. 1 shows a perspective, cut-away illustration of an exhaust-gas turbocharger;

FIG. 2 shows a detail illustration of the bush and regulating flap shaft;

FIG. 3 shows a detail illustration of the wastegate device of the exhaust-gas turbocharger according to the invention.

Figure 4:
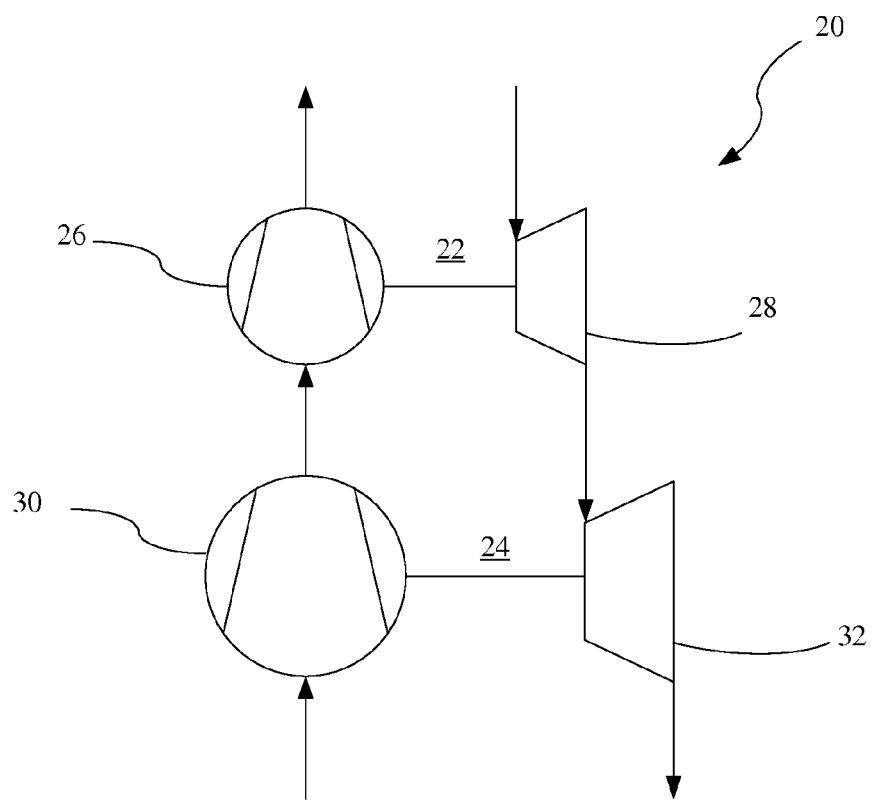
FIG. 4 shows an example of a multi-stage turbocharger system.

The exhaust-gas turbocharger 1 according to the invention will be explained in detail below on the basis of the description of the juxtaposition of FIGS. 1 to 3.

FIG. 1 illustrates an exhaust-gas turbocharger 1 which comprises a compressor 2 and a turbine 3. The turbine 3 has a turbine housing 4 which comprises a turbine housing outlet 5, and a wastegate device 6 which comprises a regulating flap 7.

As can be seen in particular from FIG. 3, the regulating flap 7 is arranged on a regulating flap shaft 9 which is guided in the turbine housing 4 by means of a bush 8.

The bush 8 is provided with an annular groove 11 formed on its inner circumference 10, as illustrated in FIG. 2. The annular groove 11 is connected by means of at least one connecting bore—two connecting bores 12, 13 in the example—to an annular collecting groove 14 which is provided in the turbine housing 3. The annular collecting groove 14 is connected by means of a relief bore 15 to the turbine housing outlet 5.

FIG. 4 shows an example of a multi-stage turbocharger system and, more particularly, a two-stage turbocharger system 20. The two-stage turbocharger system 20 includes a high pressure stage 22 and a low pressure stage 24. The high pressure stage 22 includes a high pressure compressor 26 and a high pressure turbine 28. The low pressure stage 24 includes a low pressure compressor 30 and a low pressure turbine 32. The general operation of a multi-stage turbocharger system is known.

Since the connecting bores 12, 13 illustrated in FIG. 2 reduce the leakage out into the environment, it is advantageous in this arrangement for a multiplicity of connecting bores 12, 13 to be provided. In the exemplary case of a multi-stage turbocharger arrangement, therefore, four connecting bores are provided, of which the connecting bores 12, 13 are visible in FIG. 2. Furthermore, as a result of the exhaust-gas pressure having been reduced by means of the connecting bores, it is possible for only a single piston ring 16 to be provided between the regulating flap shaft 9 and the bush 8, as a result of which the number of piston rings is reduced in relation to the prior art, which contributes to a cost reduction.

To complement the above disclosure, reference is explicitly made to the diagrammatic illustration in FIGS. 1 to 4 of the invention.

LIST OF REFERENCE NUMERALS

1 Turbocharger/exhaust-gas turbocharger
2 Compressor
3 Turbine
4 Turbine housing
5 Turbine housing outlet
6 Wastegate device
7 Regulating flap
8 Bush
9 Regulating flap shaft
10 Inner circumference
11 Annular groove
12, 13 Connecting bore
14 Annular collecting groove
15 Relief bore
16 Piston ring
20 Two-stage turbocharger system
22 High pressure stage
24 Low pressure stage
26 High pressure compressor
28 High pressure turbine
30 Low pressure compressor
32 Low pressure turbine

The invention claimed is:
1. A turbocharger comprising:
a compressor, and a turbine, the turbine including a turbine housing and a wastegate device, the turbine housing including a turbine housing outlet, the wastegate device including a regulating flap and a regulating flap shaft, the regulating flap being arranged on the regulating flap shaft, the turbine further including a bush, the regulating flap shaft being guided in the turbine housing by the bush, the bush having an annular groove formed on an inner circumference thereof, the annular groove being connected by at least one connecting bore to an annular collecting groove which is provided in the turbine housing, the collecting groove being connected by at least one relief bore to the turbine housing outlet.

2. The exhaust-gas turbocharger as claimed in claim 1, wherein a multiplicity of connecting bores is provided.

3. The exhaust-gas turbocharger as claimed in claim 2, wherein four connecting bores are provided.

4. The exhaust-gas turbocharger as claimed in claim 1, wherein a single piston ring is provided between the regulating flap shaft and bush.

5. A two-stage turbocharger, comprising a low pressure stage and a high pressure stage, wherein the low pressure stage comprises:
   a compressor, and
   a turbine, the turbine including:
   a turbine housing and a wastegate device, the turbine housing including a turbine housing outlet,
   the wastegate device including a regulating flap and a regulating flap shaft, the regulating flap being arranged on the regulating flap shaft,
   the turbine further including a bush, the regulating flap shaft being guided in the turbine housing by the bush,
   the bush having an annular groove formed on an inner circumference thereof, the annular groove being connected by at least one connecting bore to an annular collecting groove which is provided in the turbine housing, the collecting groove being connected by at least one relief bore to the turbine housing outlet.

* * * * *